H. MEREDITH-JONES.
STARTING MECHANISM FOR EXPLOSIVE ENGINES.
APPLICATION FILED MAR. 11, 1912.
1,087,965.
Patented Feb. 24, 1914.
2 SHEETS—SHEET 1.
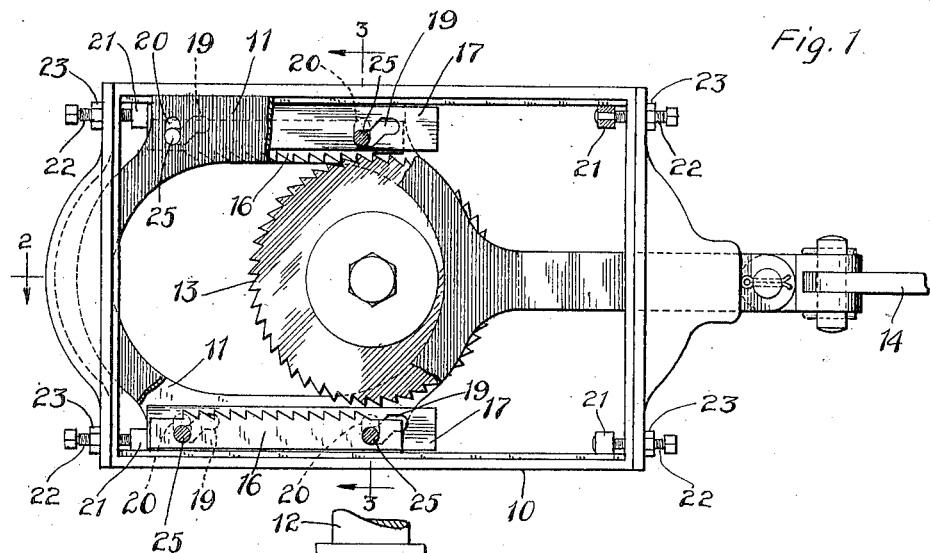
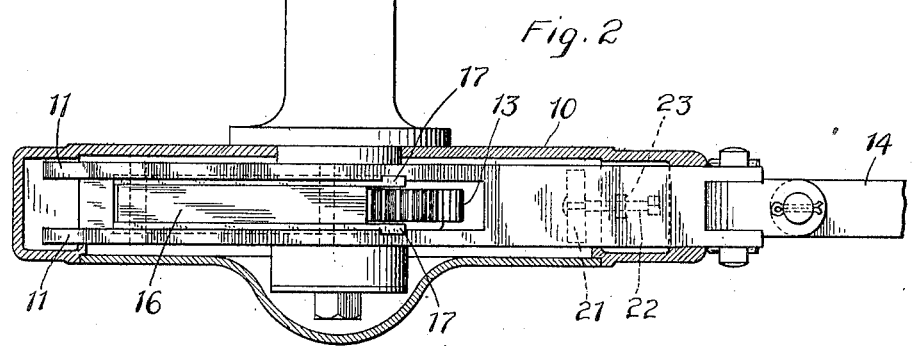
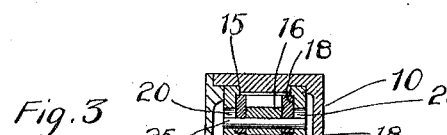
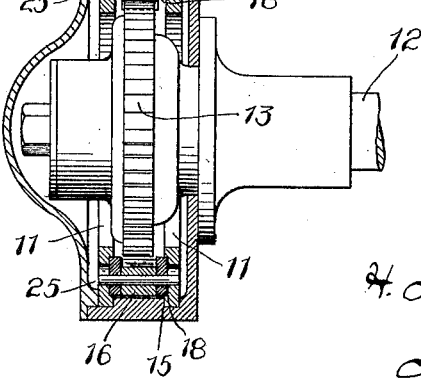
WITNESSES:
H. W. Meade
S. W. Atherton
INVENTOR
H. Meredith-Jones
BY
H. M. Wooster
ATTORNEY H. MEREDITH-JONES.
STARTING MECHANISM FOR EXPLOSIVE ENGINES.
APPLICATION FILED MAR. 11, 1912.

1,087,965.

Patented Feb. 24, 1914.
2 SHEETS—SHEET 2.

WITNESSES:
J.W. Meade
S.W. Atherton

INVENTOR
H. Meredith-Jones
BY
N. Wooster
ATTORNEY

UNITED STATES PATENT OFFICE.

HUBERT MEREDITH-JONES, OF NEW YORK, N. Y., ASSIGNOR TO COLUMBIA NUT AND BOLT COMPANY INCORPORATED, OF BRIDGEPORT, CONNECTICUT, A CORPORATION OF NEW YORK.

STARTING MECHANISM FOR EXPLOSIVE-ENGINES.

1,087,965. Specification of Letters Patent. Patented Feb. 24, 1914.

Application filed March 11, 1912. Serial No. 682,879.

*To all whom it may concern:*

Be it known that I, HUBERT MEREDITH-JONES, a subject of the King of Great Britain, residing at New York city, county of New York, State of New York, have invented an Improvement in Starting Mechanism for Explosive-Engines, of which the following is a specification.

This invention has for its object to provide simple and inexpensive mechanism adapted for general use wherever it may be required to transform horizontal reciprocating into rotary motion and especially adapted as a starting device for explosive engines, as upon motor vehicles and aeroplanes, an important feature of the invention being that the rotating member is never out of engagement with the reciprocating member from which it receives motion, thus preventing backward movement of the rotating member and the shaft.

With the above and other objects in view, the invention consists in certain constructions and in certain parts, improvements and combinations, which will be hereinafter described and then specifically pointed out in the claims hereunto appended.

Figure 4:
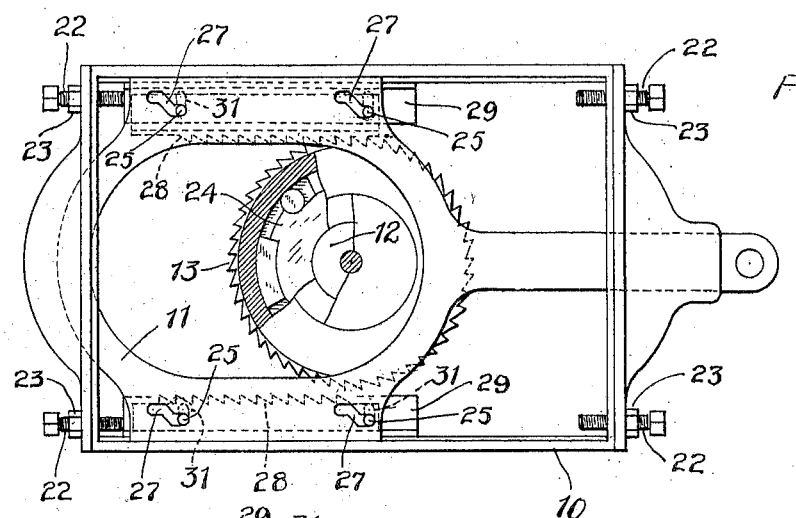
Figure 5:
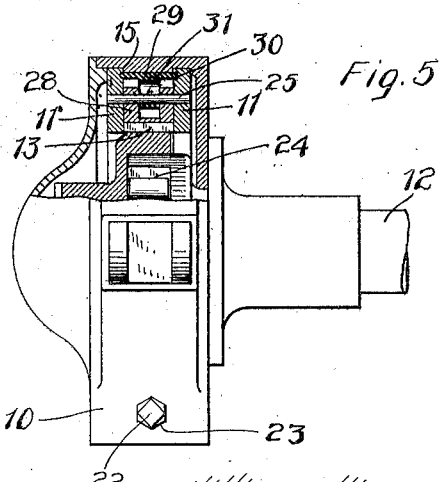
Figure 6:
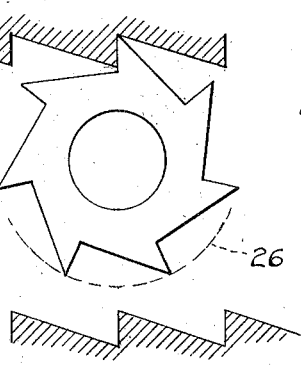

In the accompanying drawings forming a part of this specification, in which like characters of reference indicate the same parts, Figure 1 is an elevation, partly in section, illustrating one form of my novel mechanism; Fig. 2, a horizontal section of the casing on the line indicated by 2 in Fig. 1, looking in the direction of the arrow, the operating parts being in plan; Fig. 3, a vertical section on the line 3—3 in Fig. 1, looking in the direction of the arrows; Fig. 4, a view corresponding with Fig. 1 illustrating a variant form of the mechanism; Fig. 5, an end elevation partly in vertical section, as seen from the right in Fig. 4; and Fig. 6 is a diagrammatic view illustrating the feature of the continuous engagement of the rotary member with a reciprocating member from which it receives motion.

10 denotes a casing, 11 a frame adapted to reciprocate in ways 15 in the casing, 12 an engine shaft and 13 a ratchet wheel rigidly secured thereto and lying within the frame. Reciprocatory movement is imparted to the frame in any ordinary or preferred manner as by means of a starting lever, not shown, at the seat of a motor car or aeroplane. I have simply shown a link 14 connected to the frame by a universal joint as a means of imparting movement thereto. The ratchet wheel is engaged on opposite sides by racks 16, each of which carries a plurality of pins 25 (two in the present instance) which are rigidly secured therein transversely and project on opposite sides thereof.

17 denotes slides lying, on opposite sides of the racks, in ways 18 in the frame. In the form illustrated in Figs. 1, 2 and 3, the pins pass through slots 19 in the slides, each slot comprising a central oblique portion and a longitudinal portion at each end thereof, and engage vertical slots 20 in the frame.

21 denotes stops placed at opposite ends of the casing in position to be engaged by the slides just before the frame reaches the end of its movement in either direction. In Fig. 1 the stops shown are blocks carried by screws 22 in the ends of the casing, the blocks being pivoted at the ends of the screws which are locked in place after adjustment by set nuts 23.

24, see Figs. 4 and 5, indicates releasing mechanism intermediate the ratchet wheel and the shaft, which will not be described in this specification, as it comprises an independent invention which is fully described and claimed in my pending application, Serial Number 682,880 filed March 11, 1912.

The operation of the present invention is as follows: When reciprocatory movement is imparted to the frame, rotary movement is at once transmitted to the ratchet wheel and shaft for the reason that one of the racks is always engaged therewith. In the position shown in Fig. 1, the frame has reached the extreme of its movement toward the left. During the movement toward the left, the lower rack was in engagement with the ratchet wheel and the pins 25 were at the upper ends of slots 20 in the frame and in the right horizontal portions of the slots 19 in the slides. Just before the frame reached the end of its movement toward the left the left ends of the slides engaged the left stops on the casing, the effect of which was, as the movement of the frame continued, to move the lower rack out of engagement with the ratchet wheel and the upper rack into engagement therewith, as in Fig. 1. In the position shown, the movement of the frame toward the right is about to commence. Near the end of the movement toward the right the right ends of the slides will engage the right stops in the casing. The continued movement of the frame and racks will cause pins 25 to pass from the lower longitudinal portions of the slots 19 and along the oblique portions of said slots into the upper horizontal portions, said pins simultaneously rising in slots 20 in the frame, the effect of which is to raise the rack simultaneously, the upper rack passing out of engagement with the ratchet wheel and the lower rack passing into engagement therewith.

It is a vitally important feature of the invention that the ratchet wheel is never out of engagement with a rack. So far as the present invention is concerned, therefore, there can be no backward movement of the shaft and ratchet wheel from compression in the engine cylinder and everything gained by reciprocation of the frame, as in starting an explosive engine, is retained through engagement of one of the racks with the ratchet wheel. Accelerated motion of the shaft, as when it is picked up by the engine, and backward rotation of the shaft as in case of back-fire, are provided for by suitable releasing mechanism 24 as previously referred to.

Fig. 6 is a diagrammatic view only and is provided to illustrate the operation of the racks in connection with the ratchet wheel. For the purposes of this specification a rack and the ratchet wheel will be considered to be in engagement when the point of a rack tooth is within the outside diameter of the ratchet wheel. The outside diameter is indicated by the dotted line 26. The ratchet wheel teeth and rack teeth are of course subject to infinite variation as regards shape and size. It is simply required that they be so laid out relatively to each other that the point of a tooth of one rack will pass within the outside diameter of the ratchet wheel before the contiguous tooth of the other rack passes outside of the outside diameter of the ratchet wheel. The diagrammatic view shows a tooth of one rack in full engagement with a ratchet wheel. It will be noted that the length of contact between the rack tooth and the ratchet wheel tooth is greater than the distance between the outside diameter and the point of a tooth of the other rack; consequently the point of a tooth of the lower rack must pass within the outside diameter of the ratchet wheel before the engaged tooth of the upper rack can pass outside said outside diameter. The possibility of end to end engagement of rack teeth and ratchet wheel teeth may be prevented by giving to the ratchet wheel an uneven number of teeth, as indicated in Fig. 6, or by setting one rack a half tooth ahead of the other rack or by adjustment of the stops to cause one rack to commence its shifting movement at the end of a reciprocation of the frame slightly before the other rack.

In the variant form illustrated in Figs. 4 and 5, the same result is accomplished by mechanism that differs only in details of construction. The frame is provided with slots 27 which correspond with the slots 19 in the slides in the other form; that is, they comprise a central oblique portion and a longitudinal portion at each end thereof. The rack 28 is made U-shaped and its opposite sides lie in contact with the frame and the pins are rigidly secured in the rack, as before. But one slide 29 is used which is made T-shaped, the upper portion engaging ways 30 in the frame and the lower portion lying between the sides of the U-shaped rack. The pins pass through vertical slots 31 in the slide, which correspond with the vertical slots 20 in the frame in the other form, and engage slots 27 in the frame. As there is but one slide, central stop screws 22 are provided, the stop blocks being omitted. The operation is precisely the same as the other form. As the frame approaches either extreme of its movement the slides engage the stop screws and the continued movement of the frame causes one rack to be raised into engagement with the ratchet wheel and the other rack out of engagement therewith as before.

Having thus described my invention, I claim:

1. Mechanism of the character described comprising a ratchet wheel, a reciprocating frame inclosing the ratchet wheel, racks carried by the frame and adapted to engage opposite sides of the ratchet wheel, slides intermediate the racks and the frame, stops adapted to be engaged by the slides and pin and slot connections between the racks, the slides and the frame for causing the racks to alternately engage and disengage the ratchet wheel, the parts being so constructed and arranged that engagement of a rack with the ratchet wheel takes place before disengagement of the other rack and backward movement of the ratchet wheel is prevented.

2. Mechanism of the character described comprising a ratchet wheel, a reciprocating frame inclosing the ratchet wheel, racks carried by the frame and engaging opposite sides of the ratchet wheel, slides also carried by the frame, pin and slot connections between the racks, the slides and the frame, and stops which are engaged by the slides before the frame reaches either extreme of its movement, continued movement of the frame acting through the slides to move a rack into engagement with the ratchet wheel and an instant later to move the other rack out of engagement therewith.

3. Mechanism of the character described comprising a casing, a frame reciprocating therein, a ratchet wheel inclosed by the casing, racks carried by the frame and engaging opposite sides of the ratchet wheel, slides also carried by the frame and stops upon the casing whereby the slides are caused to move the racks alternately into and out of engagement with the ratchet wheel.

4. Mechanism of the character described comprising a ratchet wheel, a reciprocating frame inclosing the ratchet wheel, racks carried by the frame and engaging opposite sides of the ratchet wheel, transverse pins projecting from the racks, slides also carried by the frame and stops adapted to be engaged by the slides, said frame and slides being provided with slots which are engaged by the pins to move the racks into and out of operative relation with the ratchet wheel.

5. Mechanism of the character described comprising a ratchet wheel, a reciprocating frame inclosing the ratchet wheel and provided with vertical slots, slides reciprocating in the frame and provided with slots having oblique central and longitudinal end portions, racks lying between the slides, pins carried by the racks and engaging the slots in the frame and slides, and stops adapted to be engaged by the slides whereby the racks are moved into and out of operative relation with the ratchet wheel.

6. In combination, a rotatable ratchet wheel, a reciprocating frame inclosing the ratchet wheel, independently movable racks carried by the frame and adapted to engage opposite sides of the ratchet wheel, slides also carried by the frame, stops adapted to be engaged by the slides and connections whereby the slides are caused to place the racks alternately in engagement with the ratchet wheel, substantially as described, for the purpose specified.

In testimony whereof I affix my signature in presence of two witnesses.

HUBERT MEREDITH-JONES.

Witnesses:
S. W. ATHERTON,
M. L. HAGGEMAN.